Nov. 11, 1969         L. G. ANDERSON ETAL         3,477,772
                    PRESSED METAL BEARING HOUSING
Filed Nov. 24, 1967                              2 Sheets-Sheet 1
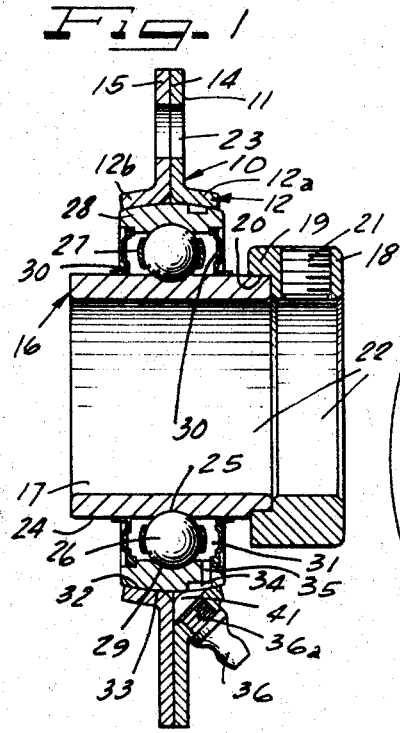
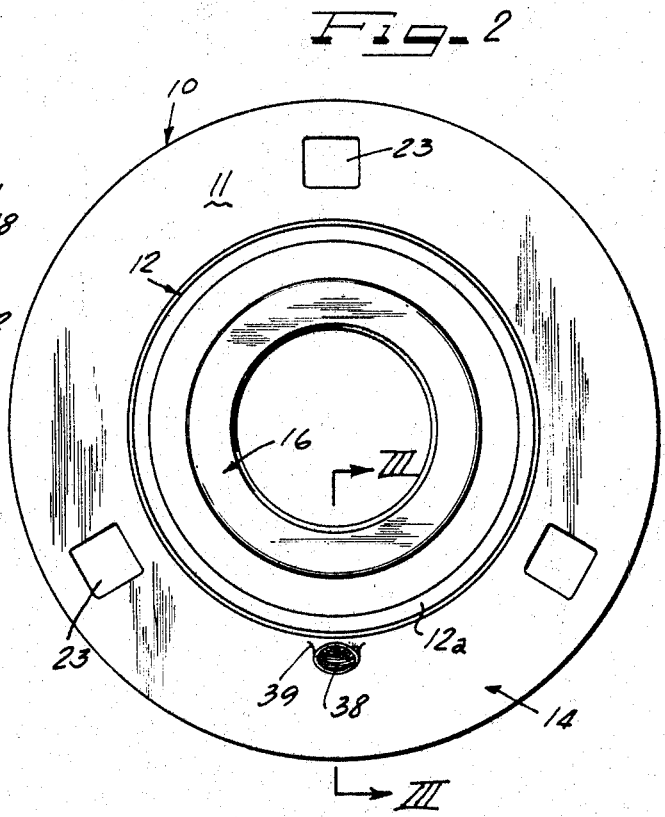
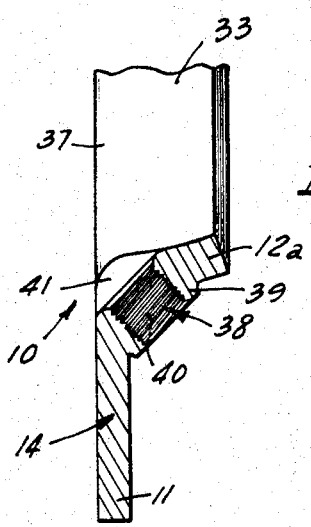
INVENTORS
LAWRENCE G. ANDERSON
LEROY M. ANDERSON
BY                                    ATTORNEYS Nov. 11, 1969        L. G. ANDERSON ETAL        3,477,772
                PRESSED METAL BEARING HOUSING
Filed Nov. 24, 1967                        2 Sheets-Sheet 2
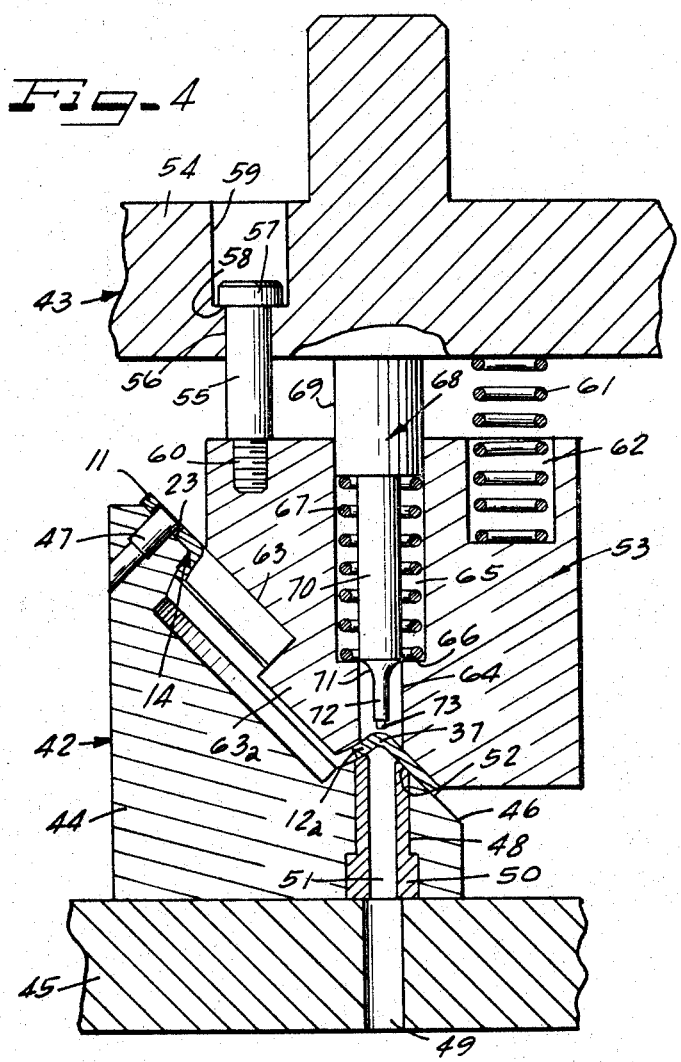
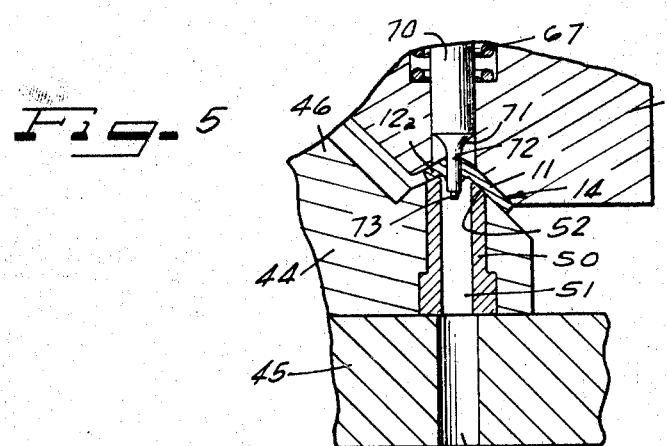
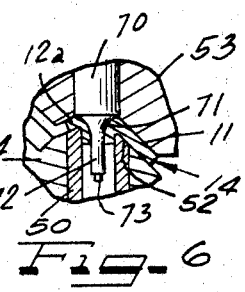
INVENTORS
LAWRENCE G. ANDERSON
LEROY M. ANDERSON
ATTORNEYS

United States Patent Office 3,477,772
Patented Nov. 11, 1969

3,477,772
PRESSED METAL BEARING HOUSING
Lawrence G. Anderson, Greenhurst, and Le Roy M. Anderson, Jamestown, N.Y., assignors to TRW Inc., Cleveland, Ohio, a corporation of Ohio
Filed Nov. 24, 1967, Ser. No. 685,423
Int. Cl. F16c 35/06, 41/02, 23/08
U.S. Cl. 308—187                                    6 Claims

ABSTRACT OF THE DISCLOSURE

A stamped or pressed metal bearing housing having an integral internally threaded lubricant fitting receiving hole of greater depth than the thickness of the metal and composed of metal displaced from the hole. The housing is a two plate flange mounting of the type used in agricultural machinery for mounting a sealed ball bearing unit and carries a threaded grease fitting for lubricating the bearing under pressure from a grease gun. The fitting is threaded in a hole formed in one plate at the junction or bight between the bearing enveloping lip of the mounting and the flange and sufficient thread length insuring retention of the grease fitting under high grease pressures is provided by metal upset during a piercing operation forming the hole which receives the fitting.

BACKGROUND OF THE INVENTION

Field of the invention

This invention relates to bearing assemblies and particularly to a housing for a bearing made of pressed metal and securely carrying a grease fitting.

Prior art

Pillow blocks, flange mounts, and the like housings for sealed anti-friction bearing units are some times provided with lubricant fittings for regreasing the bearing. In those instances where the housings are formed of cast metal or pressed metal of sufficient thickness to provide enough metal for a threaded hole to receive the grease fitting, the fitting may be securely attached to the housing and withstand high internal grease pressures. However in those instances where inexpensive relatively thin pressed metal housings are used sufficient metal thickness has not been available for securely retaining a grease fitting under high grease pressures. Heretofore used non-threaded pressed-in grease fittings have not proven satisfactory because they easily pop out under pressure of the lubricant. Attempts to reinforce the mounting for the fitting by the provision of cast metal inserts in the housing providing a threaded hole to receive the grease fitting have greatly increased the cost of the housing and complicated the manufacturing technique.

SUMMARY

The present invention now provides a stamped or pressed thin metal housing for a bearing unit which carries a threaded grease fitting secured firmly in a thickened threaded hole in the pressed metal. Sufficient thread length is provided from metal displaced during a piercing operation which forms the hole or aperture for the fitting. The fitting will not pop out even under the highest grease pressures capable of being retained by the sealed bearing unit.

In a preferred embodiment of the invention the bearing housing takes the form of a flange mount composed of a pair of thin metal stamped or pressed plates, attached in back-to-back relation and having apertures therethrough defined by out-turned lips or flanges providing a tilting mounting for a bearing unit. These plates may be formed of metal just thick enough to resist the stresses in a particular use application of the bearing such as for example in agricultural machinery and such thin metal is insufficient to provide a thread depth therethrough capable of retaining a threaded grease fitting. However according to the present invention one of the thin metal plates is pierced and drawn to provide an upset shoulder with an aperture therethrough of sufficient depth or length to provide adequate threads for retaining the fitting. The aperture is threaded internally and is preferably located at the bight portion between the out-turned lip and flange or backing of the plate.

A feature of the invention is the provision of the aperture through the bight of the plate as described above so that the grease fitting may be positioned at an angle from the center line of the bearing housing and provide a free-flowing grease path to the bearing. This avoids heretofore-encountered grease flow restriction where the fitting had to be positioned perpendicular to the housing surface and parallel with the center line of the bearing as for example when the fitting was pressed into the housing.

It is then an object of this invention to provide a bearing housing composed of thin pressed or stamped metal and carrying a grease fitting securly anchored in a threaded hole in the housing formed from displaced metal during a piercing operation providing the hole in the housing.

A further object of this invention is to provide a flange mount for bearings from thin metal and having a localized thickened portion providing an internally threaded hole of sufficient length to form an ample anchor for a threaded grease fitting.

A still further object of this invention is to provide a thin pressed metal flange mount for sealed bearing units having a localized thickened portion at the bight between the flange and the bearing mounting lip forming an internally threaded hole of sufficient length to firmly anchor a grease fitting at an angle from the center line of the bearing housing.

A specific object of this invention is to provide a flange mount for a bearing unit composed of thin pressed metal and having a grease fitting projected at an angle of about 45 degrees from the center line of the bearing carried by the mount.

Other and further objects of this invention will be apparent to those skilled in this art from the following detailed description of the annexed sheets of drawings which, by way of a preferred embodiment of the invention, illustrate one example of the invention.

BRIEF DESCRIPTION OF THE DRAWINGS

FIGURE 1 is a cross-sectional view of a flange mount type bearing assembly utilizing a thin pressed metal bearing housing of this invention and carrying a grease fitting in threaded relation.

FIGURE 2 is a plan view of the assembly of FIGURE 1.

FIGURE 3 is an enlarged fragmentary cross-sectional view of the bearing housing of this invention taken along the line III—III of FIGURE 2.

FIGURE 4 is a fragmentary cross-sectional view of a punch press apparatus used for forming the grease fitting aperture and boss or shoulder on the housing of this invention showing the position of the parts at the start of the piercing and drawing operation.

FIGURE 5 is an enlarged view of a portion of the press in FIGURE 4 illustrating the punching and drawing operation.

FIGURE 6 is a cross-sectional view similar to FIGURE 5 but showing the position of the parts at the conclusion of the piercing and drawing operation.

DESCRIPTION OF THE PREFERRED EMBODIMENT

As illustrated in FIGURE 1, the flange mount housing 10 is generally T-shaped in cross section having a leg portion 11 and a cross bar portion 12. The housing 10 is composed of two thin pressed metal plates or halves 14 and 15 each of which are substantially L-shaped but are joined back to back by riveting, spot welding, fastening bolts, or the like.

The cross bar or flange portion 12 of the housing 10 is integral with the leg 11 and extends outwardly therefrom at an angle greater than 90 degrees so that the flanges 12a and 12b of each flange half 14 and 15 do not extend perpendicular from the leg 11.

As shown in FIGURE 2 the flange amount housing 10 is circular and the flange or lip 12 extends outwardly around a circular aperture through the housing. A bearing unit 16 of a standard sealed ball bearing type is mounted in the aperture of the housing 10 and is retained by the lips or flanges 12a and 12b thereof. As shown the bearing unit 16 includes an inner race ring 17 adapted to snugly surround a shaft or the like to be rotatably carried by the bearing. A locking collar 18 is provided with a flange 19 overlying an eccentric end 20 on the inner race ring 17 and cam-locked thereto. The locking collar 18 is thus held against rotation relative to the inner race ring 17 in the direction of operative rotation of the bearing. Set screws such as 21 in the locking collar 18 are provided to engage a shaft extending through the common aperture 22 of the inner race ring 17 and locking collar 18. The shaft is thus locked to the inner race ring of the bearing. The flange mounting 10 in turn is affixed to the framework of the equipment carrying the shaft by fasteners or the like passed through apertures such as 23 in the leg 11 of the unit.

The inner race ring 17 has a cylindrical periphery or outer surface 24 into which is formed a groove providing a race way 25. A plurality of ball elements 26 ride in this race way 25 and are held in circumferentially spaced relation around the race ring 17 by a cage 27 as is customary in the art.

The bearing unit 16 has an outer race ring 28 surrounding the inner ring 17 in spaced concentric relation and provided around its internal circumference with a groove forming an outer race way 29 for the ball elements 26. Seals 30 span the space between the inner ring 17 and the outer ring 28 on both sides of the ball elements 26 to provide a sealed grease-retaining chamber 31 around the ball elements.

The outer periphery 32 of the outer race ring 28 is spherically convex and rides in the mating concave inner wall 33 provided by the lips 12a and 12b in tilting engagement therewith. This provides a pillow block type mounting for the bearing unit 16.

A peripheral groove 34 is formed around the outer race ring 28 under the flange 12a of the mounting and this groove communicates with the sealed interior 31 of the bearing unit 16 through one or more holes 35. The groove 34 distributes grease from a grease fitting 36 secured in the lip 12a of the plate 14 and supplies the chamber 31 through the holes 35.

Since, as explained above, the metal forming the housing 10 is quite thin, the wall thickness around the aperture receiving the grease fitting 36 is built up so as to provide a sufficient length for securely locking the grease fitting to the housing. As shown in FIGURE 3, a portion of the bight 37 at the junction between the flange 12a and the leg portion 11 of the plate 14 is pierced and drawn to provide an aperture 38 through an upset or extruded boss or shoulder portion 39. The aperture 38 is internally threaded as at 40 and a sufficient number of strong thread turns are provided to receive and retain the threaded nipple portion 36a of the fitting 36. With the grease fitting 36 in place as shown in FIGURE 1, lubricant from the fitting flows to an interior cavity 41 provided just inwardly from the fitting which is in communication with the annular groove 34 in the outer race ring 28 of the bearing unit 16. From this groove 34 of course the interior sealed chamber 31 of the bearing is supplied with grease to lubricate the ball elements 26.

In one application of the housing 10 for agricultural machinery to mount a sealed bearing unit 16 having an outer diameter of about 2½ inches, the housing metal thickness may only be about .104 inch. From such thin metal a boss 39 may be upset to provide an aperture length of ¼ inch or more which is ample to provide enough strong thread turns 40 to anchor the fitting 36.

The method of forming the shoulder or boss 39 around the aperture 38 is illustrated in FIGURES 4 and 5. As therein shown the pressed metal housing plate 14 is placed in a die assembly 42 mounted in a press 43. A lower die block 44 is secured to a press base 45 and has an inclined upper face 46 contoured to receive the plate 14. As illustrated this top face 46 has a flat rim portion receiving the leg 11 of the plate 14 and dowels such as 47 project from this rim into the apertures 23 of the leg for securing the plate against movement relative to the die block 44. The rim or lip 12a of the plate 14 is snugly received in the central recess in the top face 46.

The die block 44 has a vertical aperture 48 therethrough with a top end opening at the junction between the flat rim and recess of the die face 46 with the bottom end opening to an outlet hole 49 through the press base 45. A hardened die insert 50 is secured in the hole 48 and has a hole 51 therethrough registering with the hole 49. The top edge 52 on the insert 50 surrounds the hole 51 and provides a rim for receiving thereagainst the leg 11 and the lip 12a of the plate 14 at the junction therebetween.

A top die block 53 is suspended from the head 54 of the press 43 on bolts such as 55 which slide in bores such as 56 of the head 54 and have heads 57 bottoming on shoulders such as 58 between the bores 56 and counter bores 59. The bolts 55 are threaded at 60 into the upper ends of the die block 53.

Springs such as 61 are compressed between the press head 54 and the top of the die block 53 and extend into wells 62 of the die block 53 for urging the die block away from the press head thereby seating the bolt heads 57 on the shoulders 58.

The die block 53 has an inclined bottom face 63 for overlying the plate 14 and has a projecting nose 63a for seating in the lip or rim 12a of the plate 14. Thus when the press head 54 is lowered to compress the springs such as 61 the top die block 53 will cooperate with the bottom die block 44 to clamp the plate 14 therebetween.

A vertical hole 64 is formed in the die block 53 to register with the hole 48 of the die block 44 at the bottom end thereof. At the top end the hole 64 communicates with a counter bore 65 of larger diameter and a shoulder 66 is formed therebetween. The counter bore 65 opens through the top of the die block 53 and receives a coil spring 67 bottomed on the shoulder 66.

The press head 54 carries a punch 68 depending centrally therefrom into the counter bore 65 and having a cylindrical portion 69 slidably engaging the bore 65.

A punching tool 70 is secured in the bottom end of the portion 69 and extends freely through the spring 67 and has a diameter slidably engaging the bore 64. The leading end of the tool 70 is concavely tapered at 71 to a reduced diameter cylindrical stem 72 which terminates in a piercing head 73 of reduced diameter.

OPERATION

When the press 43 is in open position, the die blocks 44 and 53 are separated to permit mounting of the plate 14 on the die block 44 with the dowels 47 extending into the apertures 23 and with the lip or rim 52 of the die insert 50 underlying the bight portion of the plate 14 between the leg 11 and the flange or lip 12a.

When the press head 43 is lowered, the top die block 53 carried thereby will have its nose 63a backing up the lip 12a of the plate 14 and its bottom face 63 backing up the leg 11 of the plate 14 for coacting with the bottom die block 44 to clamp the bight 37 of the plate 14 against the edge 52 of the die insert 50.

When the top die block 53 is bottomed on the bottom die block 44, further downward movement of the press head 43 compresses the springs such as 61 and moves the punch head 68 into the bore 65 of the top block 53 thereby moving the tool 70 downwardly so that its piercing end 73 will initially engage the bight portion 37 of the plate 14. The bight 37 will thereupon be pierced and the tool stem 72 will enter the pierced hole as illustrated in FIGURE 5 while metal displaced from the bight portion will flow into the bore 51 of the die insert 50 and start to form the boss 39.

When the tool 70 is forced through the die 53 to a full seated position as shown in FIGURE 6 the tapered portion 71 of the tool will spread the bight, furnishing more metal for the boss 39 and providing the enlarged mouth or recess 41 freely joining the aperture with the gerase groove 34 in the bearing as is illustrated in FIGURE 1. The tool 70 is forced into the die 53 to a position deep enough to form the metal for the boss 39 into its desired shape, but not so deep that the plate 14 will hang up on the tool 70 thereby interfering with retraction of the tool. It is to be understood, of course, that FIGURE 6 is illustrative only and does not necessarily show the true depth of the tool 70 at the end of the press stroke.

Upon completion of the hole 38 and boss 39 the head 43 of the press is raised to first retract the tool 70 into the top block 53 and to then lift the block off of the plate 14 whereupon the plate may be removed from the press.

The thickened boss or shoulder 39 formed in the above described operation provides an aperture length which is amply sufficient for a number of thread turns. The aperture is threaded to provide the threads 40 and the grease fitting 36 threaded therein is anchored sufficiently to withstand any internal pressures that may be developed with a high pressure grease gun that would otherwise unseat a pressed-in fitting from a thin metal housing. It will also be understood that the enlarged mouth or recss 41 inwardly from the grease fitting insures a free open flow path for grease to the grease distributing groove 34 around the outer race ring 28 of the bearing 16. Since the grease fitting can be mounted at a 45 degree angle relative to the axis of the bearing, the gerase flow to the outer race ring of the bearing is unimpeded and grease blockage occurring in the heretofore pressed in grease fitting mounts where the fitting had to be parallel to the bearing axis is avoided.

It will of course be understood that tilting of the bearing unit 16 in the housing 10 is accommodated through a relatively wide angle without placing the grease distributing groove 34 out of communication with the enlarged recess or mouth 41.

Although we have herein set forth our invention with respect to certain specific principles and details thereof, it will be understood that these may be varied without departing from the spirit and scope of the invention as set forth in the hereunto appended claims.

We claim as our invention:

1. A combination bearing assembly and mount comprising: inner and outer concentric spaced apart raceways, a roller element receiving area therebetween, anti-friction roller elements in said area, means sealing the axial ends of said area, said inner raceway rotatable with respect to the said outer raceway, a circumferential outer diameter groove in said outer raceway, circumferentially spaced apart passage means connecting said groove to said area, the outer diameter of the said outer raceway arcuately curved in an axial direction, pair of thin metal plates with central apertures therethrough surrounded by outturned lips, means securing said plates together in back-to-back relation with the lips extending axially therefrom, the axially outermost ends of the said lips having an inner diameter less than the inner diameter of the said plates whereby the said arcuate outer diameter of the said outer raceway is adapted to be received within the central apertures of the said plates in close fit relationship therewith, one of said plates having an aperture at the bight portion between the lip and adjacent leg thereof surrounded by a thickened localized boss portion formed of metal upset from the aperture, the said boss portion providing an aperture length greater than the thickness of the metal plate, said aperture being internally threaded, said aperture communicating with the said external groove, a grease fitting secured in the internally threaded portion of the aperture, and an enlarged mouth at the inner end of said aperture freely communicating the grease fitting with the said groove.

2. The combination of claim 1 wherein the axis of the aperture is inclined towards the central axis of the assembly.

3. The combination of claim 2 wherein the axis of the aperture is inclined substantially 45° to the central axis of the housing.

4. In combination, a bearing assembly and pressed metal bearing housing comprising: a sealed bearing assembly having inner and outer raceways, a sealed anti-friction element receiving area therebetween, a circumferential groove in the outer diameter of the outer raceway, circumferentially spaced passageways communicating the said groove to the said area, the said housing comprising two realtively thin metal plates having central apertures therethrough surrounded by a curved lip merging into an outturned flange at a curved bight junction, means securing the said plates in back-to-back relationship with the said flanges extending axially outwardly, the said bearing assembly received in the central aperture of the said back-to-back plates with the said outturned flanges contacting the said outer diameter of the said outer raceway to retain the bearing assembly therein, one of said plates having an aperture therethrough at the bight junction, said aperture having a thickened boss therearound extending outwardly from the said bight, said thickened boss formed of metal displaced during the forming of said aperture, a grease fitting secured in said aperture at an angle to the axis of the said assembly, the end of the grease fitting terminating in spaced relation from the outer diameter of the said outer raceway adjacent the said circumferential groove whereby grease supplied to the combination through the grease fitting is directed to the circumferential groove and from the circumferential groove through the passageways to the said area.

5. The combination of claim 4 wherein an enlarged recess is formed in the area of the boss between the two said plates and the said circumferential groove communicates with the said recess.

6. The combination of claim 5 wherein the said circumferential recess is offset from the axial centerpoint of the said housing, the said passageways communicate to a peripheral portion of the said area and the said grease fitting and aperture project at substantially a 45° angle to the axis of the housing.

References Cited

UNITED STATES PATENTS

| 2,731,310 | 1/1956 | Potter | 308—187 |
| 2,885,236 | 5/1959 | Carlson | 308—72 |
| 2,983,550 | 5/1961 | Gannett | 308—187 |
| 2,991,551 | 7/1961 | Fogle et al. | |

EDGAR W. GEOGHEGAN, Primary Examiner

FRANK SUSKO, Assistant Examiner

U.S. Cl. X.R.

308—194